(12) United States Patent
Soto et al.

(10) Patent No.: US 11,772,866 B2
(45) Date of Patent: Oct. 3, 2023

(54) SINGLE-WALLED DISPOSABLE COOLER MADE OF DISPOSABLE, BIODEGRADABLE AND/OR RECYCLABLE MATERIAL

(71) Applicant: Igloo Products Corp., Katy, TX (US)

(72) Inventors: Benjamin Soto, Costa Mesa, CA (US); John Maldonado, Katy, TX (US); Vasanthi Iyer, Katy, TX (US); Roque Barros, Katy, TX (US)

(73) Assignee: Igloo Products Corp., Katy, TX (US)

( * ) Notice: Subject to any disclaimer, the term of this patent is extended or adjusted under 35 U.S.C. 154(b) by 949 days.

(21) Appl. No.: 16/445,566

(22) Filed: Jun. 19, 2019

(65) Prior Publication Data

US 2020/0140165 A1 May 7, 2020

Related U.S. Application Data

(60) Provisional application No. 62/754,829, filed on Nov. 2, 2018.

(51) Int. Cl.
*B65D 65/46* (2006.01)
*B65D 81/38* (2006.01)
(Continued)

(52) U.S. Cl.
CPC ....... *B65D 65/466* (2013.01); *B65D 81/3813* (2013.01); *B65D 1/22* (2013.01);
(Continued)

(58) Field of Classification Search
CPC ...... B65D 2565/385; B65D 1/46; B65D 1/42; B65D 1/22; B65D 81/3813; B65D 65/466;
(Continued)

(56) References Cited

U.S. PATENT DOCUMENTS 2,181,150 A 11/1939 Pittenger
2,613,847 A 10/1952 Carl
(Continued)

FOREIGN PATENT DOCUMENTS

AU 2707277 1/1979
AU 83403 9/1981
(Continued)

OTHER PUBLICATIONS

"Hightide lacing braid dead pulp box large size" (Rakuten) Nov. 22, 2016 (Nov. 22, 2016), retrieved from internet, <URL:https:/lglobal.rakuten.com/en/store/1 em-rue/item/948-rs001/>; entire document, especially Fig. 1-4, product information.
(Continued)

*Primary Examiner* — Christopher R Demeree
(74) *Attorney, Agent, or Firm* — Dinsmore & Shohl LLP

(57) ABSTRACT

A single-walled disposable cooler can include: a body including a base and a plurality of support walls coupled to the base, the plurality of support walls and the base defining an interior cavity of the body, and the plurality of support walls extending upwardly from the base to form an opening at an upper terminus of the body in fluid communication with the interior cavity; and a lid configured to reversibly couple with the body, the lid shaped to cover the opening of the body. The body can be made entirely of a pulp-based material.

21 Claims, 12 Drawing Sheets

(51) Int. Cl.
  *B65D 1/22* (2006.01)
  *B65D 1/42* (2006.01)
  *B65D 1/46* (2006.01)

(52) U.S. Cl.
  CPC .................. *B65D 1/42* (2013.01); *B65D 1/46* (2013.01); *B65D 2565/385* (2013.01)

(58) Field of Classification Search
  CPC ........... B65D 81/3823; B65D 81/3818; B65D 25/28; B65D 81/18; B65D 1/36; B65D 21/0233; Y02W 90/10; Y02W 90/308; F25D 3/08; F25D 2331/804; F25D 11/003; A45C 11/20; A45F 2005/1006; A45F 5/10; A45F 2005/1013
  USPC ......... 229/406, 117.11; 220/592.2, 754, 835, 220/915.2; 62/457.1, 457.7, 457.2, 60, 62/371; 206/428; 224/148.3, 148.7; 294/152
  See application file for complete search history.

(56) References Cited

U.S. PATENT DOCUMENTS

| | | | |
|---|---|---|---|
| 2,844,299 A | 7/1958 | Kessler et al. | |
| 3,194,462 A | 7/1965 | Tupper | |
| 3,266,623 A | 8/1966 | Poferl | |
| 3,791,547 A | 2/1974 | Branscum | |
| 4,047,633 A | 9/1977 | Trombly | |
| 4,213,310 A | 7/1980 | Buss | |
| D257,934 S | 1/1981 | Buss | |
| 4,344,300 A * | 8/1982 | Taylor | F25D 3/08 62/529 |
| D267,444 S | 1/1983 | Ruxton | |
| D268,979 S | 1/1983 | Ruxton | |
| D269,398 S | 6/1983 | Ruxton | |
| D289,597 S | 5/1987 | Averitt | |
| D292,056 S | 9/1987 | Decker | |
| 4,696,412 A | 9/1987 | McGowan | |
| 4,802,344 A | 2/1989 | Livingston et al. | |
| 4,823,554 A | 4/1989 | Trachtenberg et al. | |
| D307,998 S | 5/1990 | Costello | |
| 5,050,999 A | 9/1991 | Van Loon, III | |
| D323,950 S | 2/1992 | Pleet | |
| 5,111,664 A | 5/1992 | Yang | |
| 5,154,309 A | 10/1992 | Wischusen, III et al. | |
| 5,165,583 A * | 11/1992 | Kouwenberg | B65D 81/3827 220/4.24 |
| 5,263,339 A | 11/1993 | Evans | |
| 5,284,294 A | 2/1994 | Floyd | |
| 5,319,937 A | 6/1994 | Fritsch | |
| D349,007 S | 7/1994 | Costello | |
| D352,420 S | 11/1994 | Costello | |
| 5,427,308 A | 6/1995 | Swift et al. | |
| 5,582,343 A | 12/1996 | Dalvey | |
| 5,700,586 A | 12/1997 | Laiho et al. | |
| 5,797,528 A * | 8/1998 | McDuffie | F25D 3/08 224/610 |
| D400,053 S | 10/1998 | Coffee | |
| 5,860,281 A | 1/1999 | Coffee | |
| 5,924,302 A * | 7/1999 | Derifield | B65D 81/3862 62/457.2 |
| 6,085,926 A | 7/2000 | Weiss | |
| 6,295,830 B1 | 10/2001 | Newman | |
| 6,334,329 B1 | 1/2002 | Weller | |
| 6,615,985 B1 | 9/2003 | Foreman | |
| D486,357 S | 2/2004 | Leba | |
| 6,705,469 B2 | 3/2004 | Slot | |
| 6,837,420 B2 | 1/2005 | Westerman et al. | |
| 6,962,263 B2 * | 11/2005 | Cadiente | B65D 1/22 220/366.1 |
| 7,051,550 B2 | 5/2006 | Roth | |
| D527,226 S | 8/2006 | Maldonado | |
| D528,368 S | 9/2006 | Maldonado | |
| D529,344 S | 10/2006 | Maldonado | |
| 7,140,507 B2 | 11/2006 | Maldonado | |
| D534,771 S | 1/2007 | Zorn | |
| 7,344,028 B2 | 3/2008 | Hanson | |
| 7,451,709 B2 | 11/2008 | Swartfager et al. | |
| 8,348,509 B2 | 1/2013 | Wilkes et al. | |
| 8,356,712 B2 | 1/2013 | Piazza, Jr. | |
| 8,408,620 B2 | 4/2013 | Gruppioni | |
| 8,763,811 B2 | 7/2014 | Lantz | |
| D734,642 S | 7/2015 | Vasbinder et al. | |
| 9,199,782 B1 | 12/2015 | Cliatt | |
| 9,366,467 B2 | 6/2016 | Kiedaisch | |
| 9,499,294 B1 | 11/2016 | Costanzo, Jr. | |
| 9,550,618 B1 | 1/2017 | Jobe | |
| D792,486 S | 7/2017 | Li | |
| 9,751,683 B1 | 9/2017 | Jobe | |
| D802,028 S | 11/2017 | Li | |
| D802,029 S | 11/2017 | Li | |
| D802,630 S | 11/2017 | Li | |
| 9,908,022 B1 * | 3/2018 | Bowe | F25D 3/08 |
| 9,957,098 B2 | 5/2018 | Jobe | |
| D820,049 S | 6/2018 | Ahlstrom | |
| 10,046,901 B1 | 8/2018 | Jobe | |
| 10,059,495 B1 * | 8/2018 | Korustan | B32B 9/06 |
| 10,093,460 B2 | 10/2018 | Seiders et al. | |
| D836,993 S | 1/2019 | Meda | |
| D836,994 S | 1/2019 | Meda | |
| 10,167,184 B1 | 1/2019 | Samples | |
| D844,386 S | 4/2019 | Ahlstrom | |
| 10,307,761 B2 | 6/2019 | Schryver | |
| 10,392,177 B2 | 8/2019 | Lantz | |
| 10,551,110 B2 | 2/2020 | Waltermire et al. | |
| 10,597,219 B2 | 3/2020 | Jobe | |
| 10,618,690 B2 | 4/2020 | Jobe | |
| 10,625,923 B2 | 4/2020 | Jobe | |
| 10,625,925 B1 | 4/2020 | Jobe | |
| 10,633,165 B2 | 4/2020 | Aksan et al. | |
| 10,647,497 B2 | 5/2020 | Jobe | |
| D887,788 S | 6/2020 | Meda | |
| D888,503 S | 6/2020 | Meda | |
| D894,043 S | 8/2020 | Meda | |
| 10,800,595 B2 | 10/2020 | Waltermire et al. | |
| 10,807,788 B2 | 10/2020 | Jobe | |
| D901,986 S | 11/2020 | Meda | |
| 10,843,840 B2 | 11/2020 | Sollie et al. | |
| D904,830 S | 12/2020 | Meda | |
| D907,074 S | 1/2021 | Yang | |
| 10,947,025 B2 | 3/2021 | Sollie et al. | |
| D920,743 S | 6/2021 | Meda | |
| D921,439 S | 6/2021 | Meda | |
| 11,027,875 B2 | 6/2021 | Sollie et al. | |
| 11,027,885 B2 | 6/2021 | Duong | |
| 11,040,818 B2 | 6/2021 | Jobe | |
| 11,066,228 B2 | 7/2021 | Sollie et al. | |
| 11,072,483 B2 | 7/2021 | Jobe | |
| D927,938 S | 8/2021 | Meda | |
| D929,471 S | 8/2021 | Meda | |
| 11,097,886 B2 | 8/2021 | Lantz | |
| D933,449 S | 10/2021 | Ahlström | |
| 11,142,371 B2 | 10/2021 | Jobe | |
| 11,142,383 B2 | 10/2021 | Thompson | |
| D935,280 S | 11/2021 | Thelin | |
| 11,230,404 B2 | 1/2022 | Sollie et al. | |
| 11,247,827 B2 | 2/2022 | Jobe | |
| 11,297,920 B2 * | 4/2022 | Royce | A45C 3/10 |
| D953,814 S | 6/2022 | Thelin | |
| D954,764 S | 6/2022 | Meda | |
| 11,358,780 B2 | 6/2022 | Jobe | |
| 11,359,848 B2 | 6/2022 | Guan | |
| 2002/0020104 A1 | 2/2002 | Kolar et al. | |
| 2003/0216492 A1 | 11/2003 | Bowden et al. | |
| 2004/0089582 A1 | 5/2004 | Hendrix, Jr. | |
| 2004/0178208 A1 | 9/2004 | Minh | |
| 2005/0035119 A1 | 2/2005 | Hull et al. | |
| 2005/0109776 A1 | 5/2005 | Camp | |
| 2005/0127081 A1 | 6/2005 | Minh | |
| 2005/0150624 A1 | 7/2005 | Toh et al. | |

(56) References Cited

U.S. PATENT DOCUMENTS

| | | |
|---|---|---|
| 2005/0198992 A1 | 9/2005 | Mogil et al. |
| 2005/0263432 A1 | 12/2005 | Hanson |
| 2005/0263527 A1 | 12/2005 | Maldonado |
| 2005/0263528 A1 | 12/2005 | Maldonado |
| 2005/0279123 A1 | 12/2005 | Maldonado |
| 2005/0279124 A1 | 12/2005 | Maldonado |
| 2006/0163252 A1 | 7/2006 | Zalewski |
| 2007/0023439 A1 | 2/2007 | Vaughn |
| 2007/0125118 A1 | 6/2007 | Hooper |
| 2007/0151685 A1 | 7/2007 | Horsfield et al. |
| 2008/0001373 A1 | 1/2008 | Vaughn |
| 2008/0006629 A1 | 1/2008 | Roth |
| 2008/0025544 A1 | 1/2008 | Maldonado |
| 2010/0052353 A1 | 3/2010 | Shea et al. |
| 2010/0065574 A1 | 3/2010 | Brooks |
| 2010/0078442 A1 | 4/2010 | Donchez et al. |
| 2010/0212351 A1 | 8/2010 | Chapin et al. |
| 2010/0258574 A1 | 10/2010 | Bentley |
| 2011/0182532 A1 | 7/2011 | Baltus |
| 2011/0197625 A1 | 8/2011 | Urban |
| 2013/0112694 A1 | 5/2013 | Bentley |
| 2013/0340467 A1 | 12/2013 | Kiedaisch |
| 2014/0021208 A1 | 1/2014 | Anti et al. |
| 2015/0053676 A1 | 2/2015 | Sand |
| 2015/0158656 A1 | 6/2015 | McKinnon |
| 2015/0320191 A1 | 11/2015 | Stevens |
| 2015/0344211 A1* | 12/2015 | Moon ............... B65D 81/3818 220/592.2 |
| 2016/0052692 A1 | 2/2016 | Branham |
| 2017/0023290 A1 | 1/2017 | DeMuth |
| 2017/0043937 A1 | 2/2017 | Lantz |
| 2017/0101301 A1 | 4/2017 | Volin |
| 2017/0355501 A1 | 12/2017 | Furio |
| 2018/0141718 A1 | 5/2018 | Ahlstrom |
| 2018/0162597 A1 | 6/2018 | Jobe |
| 2018/0194534 A1 | 7/2018 | Jobe |
| 2018/0201432 A1 | 7/2018 | Harding |
| 2018/0229916 A1 | 8/2018 | Jobe |
| 2018/0237184 A1 | 8/2018 | Jobe |
| 2018/0237206 A1 | 8/2018 | Jobe |
| 2018/0305109 A1 | 10/2018 | Jobe |
| 2018/0327171 A1 | 11/2018 | Waltermire et al. |
| 2018/0339838 A1 | 11/2018 | Hall |
| 2019/0032991 A1 | 1/2019 | Waltermire et al. |
| 2019/0047743 A1 | 2/2019 | Costanzo, Jr. |
| 2019/0161240 A1 | 5/2019 | Ahlstrom |
| 2019/0329961 A1 | 10/2019 | Jobe |
| 2019/0367208 A1 | 12/2019 | Jobe |
| 2019/0367209 A1 | 12/2019 | Jobe |
| 2020/0062454 A1 | 2/2020 | Duong |
| 2020/0102139 A1* | 4/2020 | Jobe .................... B65D 65/466 |
| 2020/0122909 A1 | 4/2020 | Jobe |
| 2020/0140165 A1 | 5/2020 | Soto et al. |
| 2020/0180838 A1 | 6/2020 | Lantz |
| 2020/0180846 A1 | 6/2020 | Jobe |
| 2020/0216229 A1 | 7/2020 | Weixian |
| 2020/0217571 A1 | 7/2020 | Weixian |
| 2020/0217574 A1 | 7/2020 | Thelin |
| 2020/0217575 A1 | 7/2020 | Thelin |
| 2020/0217576 A1 | 7/2020 | Weixian |
| 2020/0217578 A1 | 7/2020 | Wang |
| 2020/0270053 A1 | 8/2020 | Jobe |
| 2020/0307895 A1 | 10/2020 | Jobe |
| 2020/0317425 A1 | 10/2020 | Jobe |
| 2020/0407147 A1 | 12/2020 | Jobe |
| 2021/0070523 A1* | 3/2021 | Iyer ..................... B65D 43/022 |
| 2021/0070528 A1 | 3/2021 | Iyer |
| 2021/0071930 A1* | 3/2021 | Iyer ................... B65D 81/3818 |
| 2021/0123656 A1* | 4/2021 | Li ......................... F25D 23/066 |
| 2021/0127808 A1 | 5/2021 | Thelin |
| 2021/0214123 A1* | 7/2021 | Iyer ................... B65D 11/1826 |
| 2021/0229893 A1 | 7/2021 | Maldonado |
| 2021/0253305 A1 | 8/2021 | Duong |
| 2021/0285710 A1 | 9/2021 | Barros |
| 2022/0114847 A1 | 4/2022 | Emde |
| 2022/0114853 A1 | 4/2022 | Emde |
| 2022/0119152 A1 | 4/2022 | Blankinship |
| 2022/0154411 A1 | 5/2022 | Henry, Jr. et al. |
| 2022/0219877 A1 | 7/2022 | Jobe |
| 2022/0228406 A1 | 7/2022 | Barros |
| 2022/0258946 A1 | 8/2022 | Lantz |

FOREIGN PATENT DOCUMENTS

| | | |
|---|---|---|
| AU | 83402 | 4/1982 |
| AU | 93721 | 10/1986 |
| AU | 2003200086 | 7/2003 |
| AU | 2005262599 | 1/2006 |
| AU | 2011215734 | 8/2012 |
| AU | 201712770 | 5/2017 |
| AU | 201712777 | 5/2017 |
| AU | 201712780 | 5/2017 |
| AU | 201712782 | 5/2017 |
| AU | 201712791 | 5/2017 |
| AU | 201712799 | 5/2017 |
| AU | 201712802 | 5/2017 |
| AU | 201712803 | 5/2017 |
| AU | 201712785 | 7/2017 |
| AU | 201716789 | 11/2017 |
| AU | 201716791 | 11/2017 |
| AU | 201717667 | 1/2018 |
| AU | 201717669 | 1/2018 |
| AU | 201717670 | 1/2018 |
| AU | 201717674 | 1/2018 |
| AU | 201717676 | 1/2018 |
| AU | 201717662 | 2/2018 |
| AU | 2016304711 | 3/2018 |
| AU | 2017240890 | 11/2018 |
| AU | 201816061 | 1/2019 |
| AU | 201910011 | 2/2019 |
| AU | 201913598 | 8/2019 |
| AU | 201913601 | 8/2019 |
| AU | 201913603 | 8/2019 |
| AU | 201913604 | 8/2019 |
| AU | 201913607 | 8/2019 |
| AU | 201913624 | 8/2019 |
| AU | 201913626 | 8/2019 |
| AU | 201913627 | 8/2019 |
| AU | 201913631 | 8/2019 |
| AU | 201913633 | 8/2019 |
| AU | 202012545 | 6/2020 |
| AU | 202012548 | 6/2020 |
| AU | 2019284128 | 7/2020 |
| AU | 2019284129 | 7/2020 |
| AU | 2019284130 | 7/2020 |
| AU | 2019284131 | 7/2020 |
| AU | 2019284133 | 7/2020 |
| AU | 2019284134 | 7/2020 |
| AU | 2019302329 | 1/2021 |
| AU | 2019325454 | 1/2021 |
| AU | 2019376154 | 3/2021 |
| AU | 2019371335 | 5/2021 |
| AU | 2021225159 | 9/2021 |
| CA | 48429 | 7/1981 |
| CA | 48762 | 10/1981 |
| CA | 53100 | 7/1984 |
| CA | 1281859 | 3/1991 |
| CA | 2229259 | 8/1998 |
| CA | 2460597 | 9/2004 |
| CA | 2570413 | 1/2006 |
| CA | 2789507 | 8/2011 |
| CA | 2995339 | 2/2017 |
| CA | 3019638 | 10/2017 |
| CA | 3059900 | 8/2018 |
| CA | 3059901 | 8/2018 |
| CA | 179459 | 12/2018 |
| CA | 179460 | 12/2018 |
| CA | 3105713 | 1/2020 |
| CA | 3106550 | 2/2020 |
| CA | 3117297 | 5/2020 |
| CA | 214387 | 7/2022 |
| CN | 101370699 | 2/2009 |
| CN | 101431913 | 5/2009 |
| CN | 201235982 | 5/2009 |

(56) References Cited

FOREIGN PATENT DOCUMENTS

| | | |
|---|---|---|
| CN | 106068433 | 11/2016 |
| CN | 109195880 | 1/2019 |
| CN | 106233083 | 7/2019 |
| CN | 110191654 | 8/2019 |
| CN | 110267883 | 9/2019 |
| CN | 110536844 | 12/2019 |
| CN | 110536845 | 12/2019 |
| CN | 305553099 | 1/2020 |
| CN | 305751278 | 5/2020 |
| CN | 306079204 | 9/2020 |
| CN | 112424547 | 2/2021 |
| CN | 112585416 | 3/2021 |
| CN | 112739630 | 4/2021 |
| CN | 112955703 | 6/2021 |
| CN | 112996411 | 6/2021 |
| CN | 113023106 | 6/2021 |
| DE | 2609519 A1 | 9/1977 |
| DE | 3020740 A1 | 12/1981 |
| DE | 20110247 | 12/2002 |
| DE | 10146618 A1 | 4/2003 |
| DE | 202004010081 | 9/2004 |
| DE | 202007001638 | 5/2007 |
| DE | 202009015164 | 3/2010 |
| DE | 202013007655 | 1/2015 |
| DE | 102013016278 A1 | 4/2015 |
| DE | 102019200065 | 1/2019 |
| DE | 102019200067 | 1/2019 |
| DE | 102019200068 | 1/2019 |
| DE | 102019200070 | 1/2019 |
| DE | 112017005901 | 8/2019 |
| DE | 102019200063 | 7/2020 |
| DE | 102019200064 | 7/2020 |
| EP | 1765109 | 3/2007 |
| EP | 2534026 | 12/2012 |
| EP | 3334665 | 6/2018 |
| EP | 3571126 | 11/2019 |
| EP | 3583050 | 12/2019 |
| EP | 3585707 | 1/2020 |
| EP | 3821186 | 5/2021 |
| EP | 3826941 | 6/2021 |
| EP | 3841338 | 6/2021 |
| EP | 3856658 | 8/2021 |
| EP | 3874211 | 9/2021 |
| EP | 3876785 | 9/2021 |
| EP | 3436368 | 12/2021 |
| EP | 4019428 | 6/2022 |
| EP | 4029806 | 7/2022 |
| ES | 1030365 | 8/1995 |
| ES | 1030365 Y | 7/1996 |
| GB | 1198352 A | 7/1970 |
| HK | 1256949 | 10/2019 |
| JP | 11006677 | 1/1999 |
| JP | 2003-128163 A | 5/2003 |
| JP | 2004299764 | 10/2004 |
| JP | 2005053510 | 3/2005 |
| KR | 1020040080384 | 9/2004 |
| KR | 20110000450 U | 1/2011 |
| KR | 1020180136462 | 12/2018 |
| KR | 1020190122725 | 10/2019 |
| KR | 1020210038924 | 4/2021 |
| KR | 1020210040356 | 4/2021 |
| KR | 1020210048496 | 5/2021 |
| KR | 1020210072022 | 6/2021 |
| KR | 1020210084483 | 7/2021 |
| MX | PA04001493 | 12/2004 |
| MX | PA06014878 | 10/2007 |
| MX | 2018011945 | 9/2019 |
| MX | 2019009851 | 12/2019 |
| MX | 2019010120 | 12/2019 |
| WO | 0209975 A1 | 2/2002 |
| WO | 2005123539 | 12/2005 |
| WO | 2006007266 | 1/2006 |
| WO | 2006009537 | 1/2006 |
| WO | 2007016092 | 2/2007 |
| WO | 2008013973 | 1/2008 |
| WO | 2011094355 | 8/2011 |
| WO | 2011100522 | 8/2011 |
| WO | WO2017172029 | 10/2017 |
| WO | 2018095957 | 5/2018 |
| WO | WO2018107087 | 6/2018 |
| WO | WO2018152367 | 8/2018 |
| WO | WO2018156481 | 8/2018 |
| WO | WO2018165164 | 9/2018 |
| WO | WO2019231934 | 12/2019 |
| WO | 2020013913 | 1/2020 |
| WO | WO2020023520 | 1/2020 |
| WO | 2020041236 | 2/2020 |
| WO | WO2020069444 | 4/2020 |
| WO | 2020091849 | 5/2020 |
| WO | WO2020092023 | 5/2020 |
| WO | WO2020176294 | 9/2020 |
| WO | 2021050253 | 3/2021 |
| WO | 2021050255 | 3/2021 |
| WO | 2021050298 | 3/2021 |
| WO | 2021086620 | 5/2021 |
| WO | 2021145971 | 7/2021 |
| WO | 2021154394 | 8/2021 |
| WO | 2022081513 | 4/2022 |
| WO | 2022189901 A1 | 9/2022 |
| WO | 2022189904 A1 | 9/2022 |
| WO | 2022238971 A1 | 11/2022 |

OTHER PUBLICATIONS 23 3/4" × 14" White Foam Food Pan Carrier (webstaurantstore.com) Jul. 28, 2016 (Jul. 28, 2016), retrieved from internet, https://www.webstaurantstore.com/restaurant-storage-transport.html; entire document especially, Fig. 1, 5, specs.

"30 Qt. Promo Cooler" (homedepot.com) Nov. 8, 2015 (Nov. 8, 2015), retrieved from internet, https://www.homedepot.com/p/30-Qt-Promo-Cooler-3542/203336080, entire document especially Fig. 1, product overview.

International Search Report and Written Opinion issued in PCT/US2019/037896, dated Sep. 16, 2019, 11 pages.

Vericool Inc, To Unveil Revolutionary Reusable Sustainable Consumer Cooler, at 2018 Pack Expo in Chicago, Oct. 11, 2018, 3 Pages.

Chinese Patent Application No. 201980071993.2 titled "Single-Walled Disposable Cooler Made of Disposable, Biodegradable and/or Recyclable Material" filed on Apr. 21, 2021.

European Patent Application No. 19879731.8 titled "Single-Walled Disposable Cooler Made of Disposable, Biodegradable and/or Recyclable Material" filed on Feb. 6, 2021.

Japanese Patent Application No. 2021-524237 titled "Single-Walled Disposable Cooler Made of Disposable, Biodegradable and/or Recyclable Material" filed on Jun. 5, 2021.

Korean Patent Application No. 10-2021-7013187 titled "Single-Walled Disposable Cooler Made of Disposable, Biodegradable and/or Recyclable Material" filed on Apr. 30, 2021.

Mexican Patent Application No. MX/a/2021/005094 titled "Single-Walled Disposable Cooler Made of Disposable, Biodegradable and/or Recyclable Material" filed on Apr. 30, 2021.

PCT Patent Application No. PCT/US2019/037896 titled "Single-Walled Disposable Cooler Made of Disposable, Biodegradable and/or Recyclable Material" filed on Jun. 19, 2019.

International Preliminary Report on Patentability issued in PCT Patent Application No. PCT/US2019/037896 dated May 14, 2021.

U.S. Appl. No. 62/754,829 titled "Single-Walled Disposable Cooler Made of Disposable, Biodegradable and/or Recyclable Material" filed on Nov. 2, 2018.

U.S. Appl. No. 62/898,117 titled "Biodegradable Cooler" filed Sep. 10, 2019.

U.S. Appl. No. 17/000,897 titled "Biodegradable Cooler" filed Aug. 24, 2020.

Restriction Requirement issued in U.S. Appl. No. 17/000,897 dated Mar. 18, 2022.

Non-Final Office Action issued in U.S. Appl. No. 17/000,897 dated Jun. 13, 2022.

(56) References Cited

OTHER PUBLICATIONS

PCT Application No. PCT/US2020/047621 titled "Biodegradable Cooler" filed on Aug. 24, 2020.
International Search Report and Written Opinion issued in PCT Application No. PCT/US2020/047621 dated Nov. 6, 2020.
International Preliminary Report on Patentability issued in PCT Application No. PCT/US2020/047621 dated Mar. 24, 2022.
European Patent Application No. 20862298.5 titled "Biodegradable Cooler" filed on Mar. 9, 2022.
China Patent Application No. 202080063536.1 titled "Biodegradable Cooler" filed on Mar. 10, 2022.
Australia Patent Application No. 2020345686 titled "Biodegradable Cooler" filed on Mar. 9, 2022.
U.S. Appl. No. 62/898,084 titled "Cooler With Carry Handle" filed Sep. 10, 2019.
U.S. Appl. No. 17/000,862 titled "Cooler With Carry Handle" filed Aug. 24, 2020.
Non-Final Office Action issued in U.S. Appl. No. 17/000,862 dated Nov. 15, 2021.
Ex-Parte Quayle Action issued in U.S. Appl. No. 17/000,862 mailed on Mar. 25, 2022.
Notice of Allowance issued in U.S. Appl. No. 17/000,862 dated Jun. 15, 2022.
PCT Application No. PCT/US2020/047617 titled "Cooler With Carry Handle" filed on Aug. 24, 2020.
International Search Report and Written Opinion issued in PCT Application No. PCT/US2020/047617 dated Feb. 16, 2021.
International Preliminary Report on Patentability issued in PCT Application No. PCT/US2020/047617 dated Mar. 24, 2022.
European Application No. 20862934.5 titled "Cooler With Carry Handle" filed on Mar. 9, 2022.
China Application No. 202080063584.0 titled "Cooler With Carry Handle" filed on Mar. 10, 2022.
Australia Application No. 2020346704 titled "Cooler With Carry Handle" filed on Mar. 9, 2022.
U.S. Appl. No. 62/898,089 titled "Double-Walled, Slip Fit Cooler" filed Sep. 10, 2019.
U.S. Appl. No. 17/006,282 titled "Double-Walled, Slip Fit Cooler" filed Aug. 24, 2020.
Non-Final Office Action issued in U.S. Appl. No. 17/006,282 dated Sep. 7, 2021.
Final Office Action issued in U.S. Appl. No. 17/006,282 dated Jan. 5, 2022.
Advisory Action issued in U.S. Appl. No. 17/006,282 dated Apr. 21, 2022.
Non-Final Office Action issued in U.S. Appl. No. 17/006,282 dated Jun. 29, 2022.
PCT Application No. PCT/US2020/048504 titled "Double-Walled, Slip Fit Cooler" filed on Aug. 24, 2020.
International Search Report and Written Opinion issued in PCT Application No. PCT/US2020/048504 dated Nov. 20, 2020.
International Preliminary Report on Patentability issued in PCT Application No. PCT/US2020/048504 dated Mar. 24, 2022.
European Application No. 20862669.7 titled "Double-Walled, Slip Fit Cooler" filed on Mar. 9, 2022.
China Application No. 202080063537.6 titled "Double-Walled, Slip Fit Cooler" filed on Mar. 10, 2022.
Australia Application No. 2020345695 titled "Double-Walled, Slip Fit Cooler" filed on Mar. 9, 2022.
Office Action issued in Chinese Application No. 201980071993.2 dated Oct. 19, 2022.
Extended European Search Report issued in European Patent Application No. 19879731.8 dated Oct. 20, 2022.
Notice of Allowance issued in U.S. Appl. No. 17/000,862 dated Oct. 20, 2022.
Final Office Action issued in U.S. Appl. No. 17/006,282 dated Nov. 16, 2022.
NS Packaging, Vericool unveils sustainable product lines: URL: https://www.nspackaging.com/news/vericool-sustainable-coolers/, Oct. 15, 2018, 2 pages.
Office Action and Search Report issued in Chinese Application No. 201980071993.2 dated May 27, 2022, 10 pages.
"Cool sustainability: Vericool provides environmental edge with innovative chill packs", Retrieved from the Internet: URL:https://www.packaginginsights.com/news/chilled-packaging-vericool-coolers-provide-sustainable-edge-in-fresh-food-delivery.html, Sep. 3, 2018, 2 pages.
Partial Supplementary European Search Report issued in EP Patent Application No. 19879731.8 dated Jul. 8, 2022.
Design U.S. Appl. No. 29/708,155, filed Oct. 3, 2019 titled Latch.
Design U.S. Appl. No. 29/708,156, filed Oct. 3, 2019 titled Latch.
Dometic Product Catalog—Coolers; 2015.
Dometic Product Catalog—Coolers; 2016.
Design U.S. Appl. No. 29/820,716, filed Dec. 23, 2021 titled Container.
Design U.S. Appl. No. 29/820,717, filed Dec. 23, 2021 titled Container.
U.S. Appl. No. 17/668,767, filed Feb. 10, 2022 titled Insulated Container.
U.S. Appl. No. 17/720,019, filed Apr. 13, 2022 titled Packable Cooler Bag.
PCT Application No. PCT/IB2022/056075 filed Jun. 29, 2022 titled Soft-Sided Cooler.
U.S. Appl. No. 63/353,281, filed Jun. 17, 2022 titled Insulated Container.
PCT Application No. PCT/US2022/031282 filed May 27, 2022 titled Insulated Container.
U.S. Appl. No. 17/825,374, filed May 26, 2022 titled Mobile Cooling Box with Ice Maker.
Design U.S. Appl. No. 29/840,161, filed May 26, 2022 titled Cooler Fender Frame.
U.S. Appl. No. 17/872,514, filed Jul. 25, 2022 titled Mobile Cooling Box with Hinge Module.
U.S. Appl. No. 17/874,162, filed Jul. 26, 2022 titles Thermal Insulation Bag.
PCT Application No. PCT/US2022/026932 filed Apr. 29, 2022 titled Accessory Grid Apparatus for a Cooler.
U.S. Appl. No. 17/875,693, filed Jul. 28, 2022 titled Containment System Including a Soft Container.
Design U.S. Appl. No. 29/836,642, filed Apr. 28, 2022 titled Half Sleeve Ice Block.
Design U.S. Appl. No. 29/823,704, filed Jan. 19, 2022 titled Insulated Box.
MX Application No. MX/f/2022/002028 filed Jul. 19, 2022 titled Insulated Box.
EU App. No. 009092620 filed Jul. 19, 2022 titled Insulated Box.
U.S. Appl. No. 17/874,701, filed Jul. 27, 2022 titled Locking Module for a Container.
PCT Application No. PCT/US2022/038492 filed Jul. 27, 2022 titled Locking Module for a Container.
U.S. Appl. No. 17/887,106, filed Aug. 12, 2022 titled Cooler.
U.S. Appl. No. 17/886,803, filed Aug. 12, 2022 titled Mobile Cooling Box with Handle Module.
Office Action issued in Chinese Application No. 201980071993.2 dated Feb. 3, 2023.
Office Action issued in Japanese Application No. 2021-524237 dated Apr. 4, 2023.
Corrected Notice of Allowability issued in U.S. Appl. No. 17/000,862 dated Apr. 27, 2023.
Non-Final Office Action issued in U.S. Appl. No. 17/000,897 dated Jan. 23, 2023.
Notice of Allowance issued in U.S. Appl. No. 17/000,862 dated Feb. 8, 2023.
Non-Final Office Action issued in U.S. Appl. No. 17/006,282 dated Apr. 17, 2023.
Advisory Action issued in U.S. Appl. No. 17/006,282 dated Mar. 15, 2023.

\* cited by examiner

SECTION B-B

SINGLE-WALLED DISPOSABLE COOLER MADE OF DISPOSABLE, BIODEGRADABLE AND/OR RECYCLABLE MATERIAL

CROSS REFERENCE TO RELATED APPLICATIONS

This patent application claims priority under 35 U.S.C. § 119 to U.S. Provisional Patent Application No. 62/754,829, entitled "Single-Walled Disposable Cooler Made Of Pulp-Based Material" filed on Nov. 2, 2018, the entire content of which is hereby incorporated by reference herein.

TECHNICAL FIELD

The present disclosure relates generally to coolers, and more particularly, to a single-walled cooler made of a disposable, biodegradable and/or recyclable material.

BACKGROUND

Coolers, ice chests, ice boxes, or the like are commonly used to store contents (e.g., food, beverages, etc.) and keep said contents cool. While many coolers are constructed using durable materials intended for repeated use, other coolers have been manufactured to be disposable. Coolers of the disposable variety are conventionally made from polystyrene foam (i.e., Styrofoam).

Problematically, polystyrene is a non-biodegradable solid that resists chemicals otherwise causing the material to break down. Disposal of polystyrene coolers, consequently, can cause significant environmental harm as discarded polystyrene will persist in the environment for centuries. Many cities and counties across the United States have passed regulations banning sale of polystyrene products for this reason.

SUMMARY

The present disclosure provides a single-walled disposable cooler made of a disposable, biodegradable and/or recyclable material, such as a pulp-based material for example. Because the pulp-based material is compostable, recyclable, and/or biodegradable, the cooler can be disposed in an environmentally friendly manner in which the cooler degrades rapidly relative to conventional polystyrene coolers and without toxic residues.

In accordance with embodiments of the present disclosure, a single-walled disposable cooler can include: a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper terminus of the body in fluid communication with the interior cavity; and a lid configured to reversibly couple with the body, the lid shaped to cover or substantially cover the opening of the body. The body can be made entirely of a disposable, biodegradable and/or recyclable material, such as a pulp-based material for example. According to some embodiments, the plurality of support walls are formed continuously or seamlessly from the edges of the base, whereas in other exemplary embodiments, one or more of the support walls are coupled to the corresponding edges of the base non-continuously or with a seam.

The lid can be formed so as to fit inside of upper ends of the plurality of support walls. In this regard, the plurality of support walls can be formed with a ledge disposed beneath the upper ends of the plurality of support walls, the ledge being substantially parallel with the base, and the lid can be formed such that outer edges thereof rest on the ledge when the lid covers or substantially covers the opening of the body. Also, the lid can be formed with a handle portion disposed at a central region thereof.

The lid can be formed such that outer edges thereof are substantially flush with upper ends of the plurality of support walls when the lid covers or substantially covers the opening of the body. In this regard, the body can be formed with a handle portion disposed at an upper region thereof.

The single-walled disposable cooler can further include a handle wrap structurally independent of the body and the lid, the handle wrap having a cut-out portion formed therein. When the lid covers or substantially covers the opening of the body, the handle wrap can be configured to surround an entirety of the body and the lid in a longitudinal direction such that the cut-out portion is positioned above the body and the lid. The handle wrap can be made entirely of a disposable, biodegradable and/or recyclable material, such as a pulp-based material, or alternatively in other embodiments, the handle wrap may be made of a non-biodegradable and/or non-recyclable material.

The lid can be formed such that outer edges thereof are positioned outside of the plurality of support walls in a lateral direction when the lid covers the opening of the body. In this regard, the outer edges of the lid can extend downwardly below upper ends of the plurality of support walls.

The body can be formed with a handle portion disposed at an upper region of the body.

The lid can be formed with one or more cup holders disposed on a top portion thereof.

The lid can be made entirely of a disposable, biodegradable and/or recyclable material, such as the pulp-based material, or alternatively made of a non-biodegradable and/or non-recyclable material, such as a plastic or other polymer material that may or may not be a disposable, biodegradable and/or recyclable material.

The disposable, biodegradable and/or recyclable material can be a pulp-based material that can be derived from recycled paper. Also, the disposable, biodegradable and/or recyclable material, e.g. a pulp-based material, can be made with a combination of recycled paper and wax. Further, the disposable, biodegradable and/or recyclable material, e.g. a pulp-based material, can include a wax additive. In other exemplary embodiments, the disposable, biodegradable and/or recyclable material can be paper, sugar cane, hemp, bamboo or other materials that are disposable, biodegradable and/or recyclable materials.

The disposable, biodegradable and/or recyclable material, e.g. a pulp-based material, can be compostable, recyclable, and/or biodegradable.

Furthermore, in accordance with an embodiment of the present disclosure, a method for manufacturing a single-walled disposable cooler can include: forming, using a disposable, biodegradable and/or recyclable material, such as a pulp-based material, a body including a base and a plurality of support walls coupled to the base, such that at least one of the plurality of support walls includes an entirely planar surface, the plurality of support walls and the base define an interior cavity of the body, and the plurality of support walls extend upwardly from the base to form an opening at an upper region of the body in fluid communication with the interior cavity; and forming a lid configured to reversibly couple with the body, such that the lid is shaped to cover or substantially cover the opening of the body. According to some embodiments, the plurality of support walls are formed continuously or seamlessly from the edges of the base, whereas in other exemplary embodiments, one or more of the support walls are coupled to the corresponding edges of the base non-continuously or with a seam.

Furthermore, in accordance with an embodiment of the present disclosure, a cooler can include: a single-walled disposable shell made entirely of a disposable, biodegradable and/or recyclable material, such as a pulp-based material, the shell including: a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper region of the body in fluid communication with the interior cavity; and a lid configured to reversibly couple with the body, the lid shaped to cover or substantially cover the opening of the body. The lid can be formed so as to fit inside of upper ends of the plurality of support walls, and also may be formed with one or more cup holders disposed on a top portion thereof. According to some embodiments, the plurality of support walls are formed continuously or seamlessly from the edges of the base, whereas in other exemplary embodiments, one or more of the support walls are coupled to the corresponding edges of the base non-continuously or with a seam.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1A:
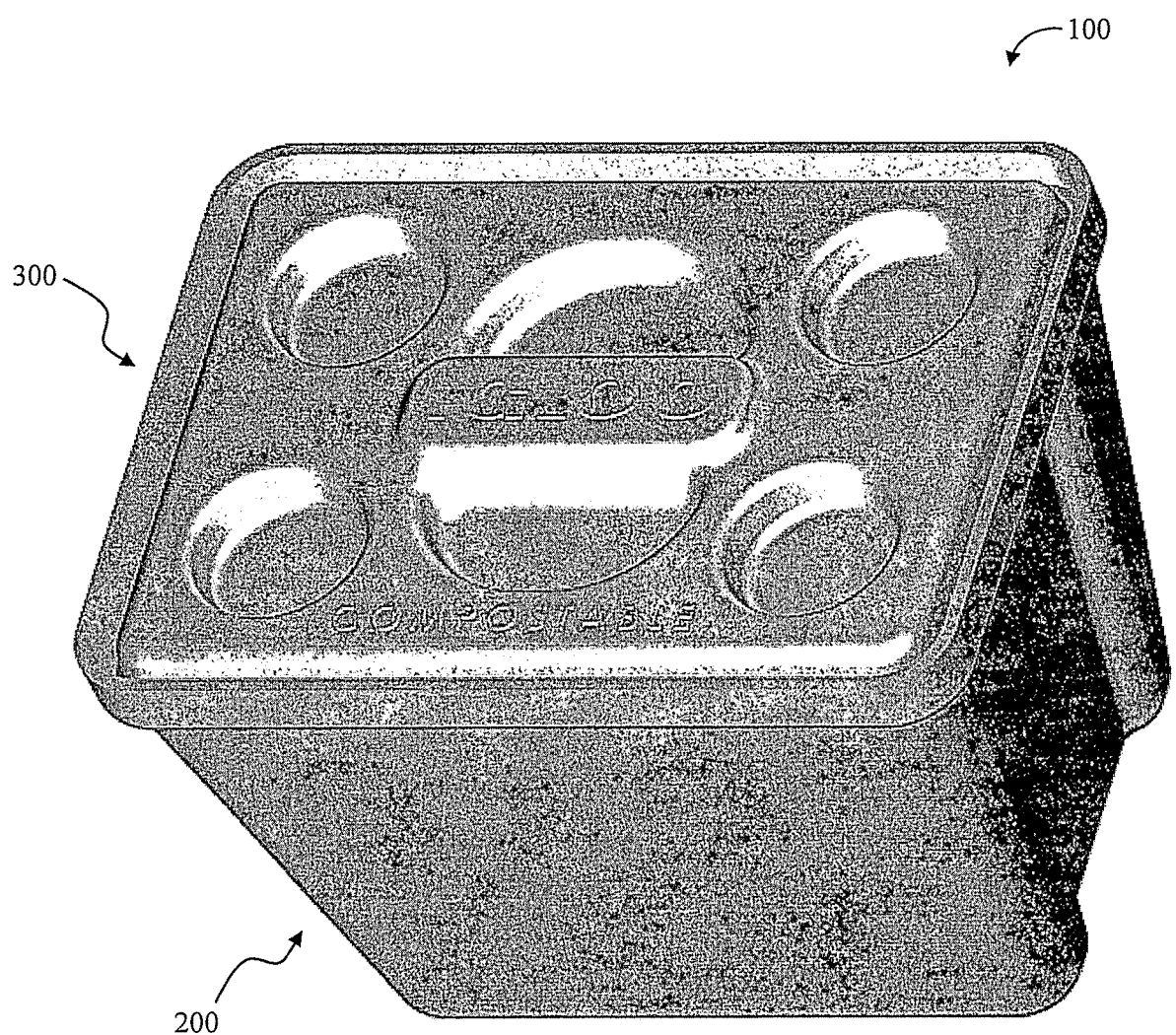
FIGS. 1A-1F include views of a single-walled disposable cooler according to a first embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the single-walled disposable cooler discussed herein can be made of a disposable, biodegradable and/or recyclable material, such as a pulp-based material, or made from paper, sugar cane, hemp, bamboo, or the like. Because the pulp-based material, or other similar type material, is compostable, recyclable, and/or biodegradable, the cooler can be disposed in an environmentally friendly manner in which the cooler degrades rapidly relative to conventional polystyrene coolers and without toxic residues.

The accompanying figures illustrate various embodiments of the disclosed single-walled disposable cooler. As described in detail hereinbelow, FIGS. 1A-1F include views of a single-walled disposable cooler according to a first embodiment of the present disclosure; FIGS. 2A-2E include views of a single-walled disposable cooler according to a second embodiment of the present disclosure; FIGS. 3A-3D include views of a single-walled disposable cooler according to a third embodiment of the present disclosure; and FIGS. 4A-4C include views of a single-walled disposable cooler according to a fourth embodiment of the present disclosure.

It is understood that the aforementioned embodiments and features associated therewith are not mutually exclusive of each other. Any of the features shown to be associated with an embodiment described herein may be adopted in another embodiment described herein. Therefore, the description herein of various embodiments does not imply that any features associated with a particular embodiment are limited solely to said embodiment.

As illustrated in each of the figures, the single-walled disposable cooler (hereinafter "cooler") 100 can include a single-walled disposable shell, made entirely of a disposable, biodegradable and/or recyclable material, such as a pulp-based material, paper, sugar cane, hemp, bamboo, or similar type material, defining a body 200. The body 200 can include a base 210 and a plurality of support walls 220 coupled to the base 210. One or more of the plurality of support walls 220 may be attached to an edge of the base 210, such as by an adhesive or some other similar attachment mechanism, or alternatively, one or more of the plurality of support walls 220 extend continuously or seamlessly from the edges of the base 210. At least one of the support walls 220 can include an entirely planar surface. That is, the support walls 220 can be formed such that the surface of at least one support wall 220 is disposed entirely in a single plane. In one example, two support walls 220 disposed on opposite sides of the base 210 can include entirely planar surfaces, respectively, while two other support walls 220 disposed on opposite sides of the base 210, each of which is substantially perpendicular to the two entirely planar support walls 220, can include non-entirely planar surfaces, respectively.

The support walls 220 and the base 210 can define an interior cavity 230 of the body 200. The support walls 220 can extend upwardly from the base 210 to form an opening 240 at an upper terminus of the body 200. The opening 240 can be in fluid communication with the interior cavity 230 of the body 200. Notably, forming at least one of the support walls 220 with an entirely planar surface can maximize the volume of the interior cavity 230, allowing for greater storage capacity in the cooler 100.

The body 200 can be formed to include various features. For instance, the body 200 can be formed with one or more handle portions disposed at an upper region of the body 200. In one example, the support walls 220 can be formed with a ledge 250 disposed beneath the upper ends of the support walls 220. The ledge 250 can be substantially parallel with the base 210. The ledge 250 can therefore function as a handle portion where a user grips an exterior portion of the ledge 250 for transport of the cooler 100. Specifically, the user can wrap his or her fingers under the inwardly extending portion of the ledge 250. Moreover, central portions of the support walls 220 can be formed with indentations so as to produce additional room under the ledge 250 for an improved grip.

The cooler 100 can further include a lid 300 capable of covering or substantially covering the opening 240 of the body 200. In this regard, the lid 300 can be configured to reversibly couple with the body 200 of the cooler 100 in any of a variety of ways, some of which are described herein across the various embodiments. The lid 300 can be shaped in conformity with the opening 240 of the body 200.

The lid 300 can be formed to include various features. For instance, the lid 300 can be formed with one or more cup holders 310 disposed on a top portion thereof. The one or more cup holders 310 can be formed into the top portion of the lid 300 in any suitable configuration. Characteristics such as the dimensions, positioning, and number of the one or more cup holders 310 can vary. In addition, one or more handle portions 320 can be formed into the lid 300, as discussed in greater detail below.

Notably, the body 200 and the lid 300 of the cooler 100 can be made entirely of a disposable, biodegradable and/or recyclable material, such as a pulp-based material. Alternatively, the body 200 can be made entirely of a disposable, biodegradable and/or recyclable material, such as a pulp-based material, and the lid 300 can be made of a non-biodegradable and/or non-recyclable material, such as a plastic, other polymer material, or other known material type that can be used for coolers.

Pulp, as is generally known in the art, is a fibrous material prepared by chemically or mechanically separating cellulose fibers from wood, recycled paper, straw, grass, or other raw fibrous materials. Pulp is understood to be more eco-friendly than polystyrene, as pulp can be biodegradable (i.e., capable of disintegrating into an innocuous material), recyclable (i.e., capable of being reused or treated for reuse), and/or compostable (i.e., capable of decomposing within 90-180 days), without release of toxic residues upon decomposition.

In some cases, the pulp-based material from which the cooler 100 is made can derive entirely from pre-consumer recycled paper. In other cases, the pulp-based material from which the cooler 100 is made can derive from a combination of the recycled paper and a wax additive (e.g., paraffin wax) added to enhance the water resistance of the cooler 100. In yet other cases, a small amount of rosin (a solid form of resin) can be added to the pulp-based material to enhance the cooler's durability. It is understood, however, that the pulp-based material can be derived from any suitable pulp-producing materials generally known in the art. Additionally, the body 200 can be formed from other disposable, biodegradable and/or recyclable material such as paper, sugar cane, hemp, bamboo, and other similar type materials. The lid 300 also may optionally be formed from pulp-based materials or other disposable, biodegradable and/or recyclable material such as paper, sugar cane, hemp, bamboo, and other similar type materials. Alternatively, the lid 300 is formed from non-biodegradable and/or non-recyclable materials.

Figure 1B:
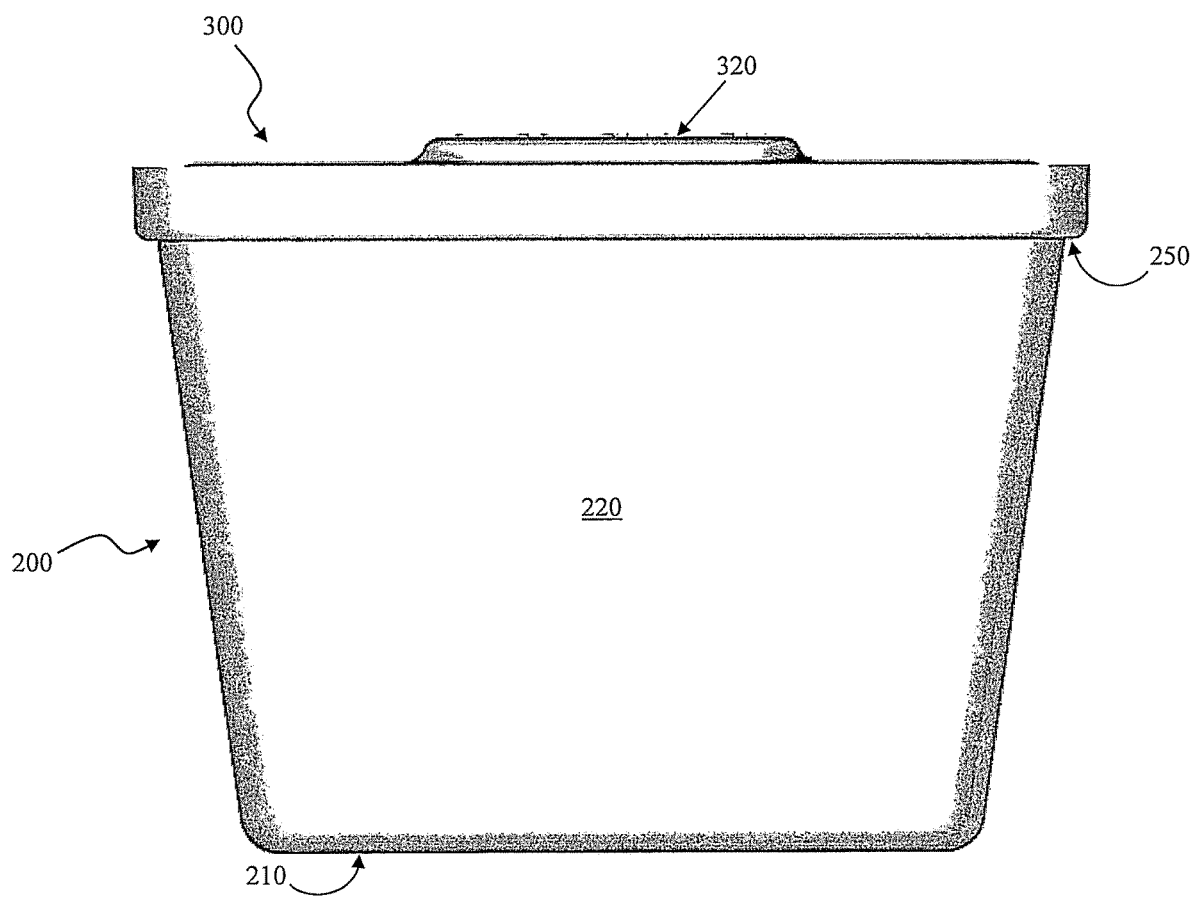
Figure 1C:
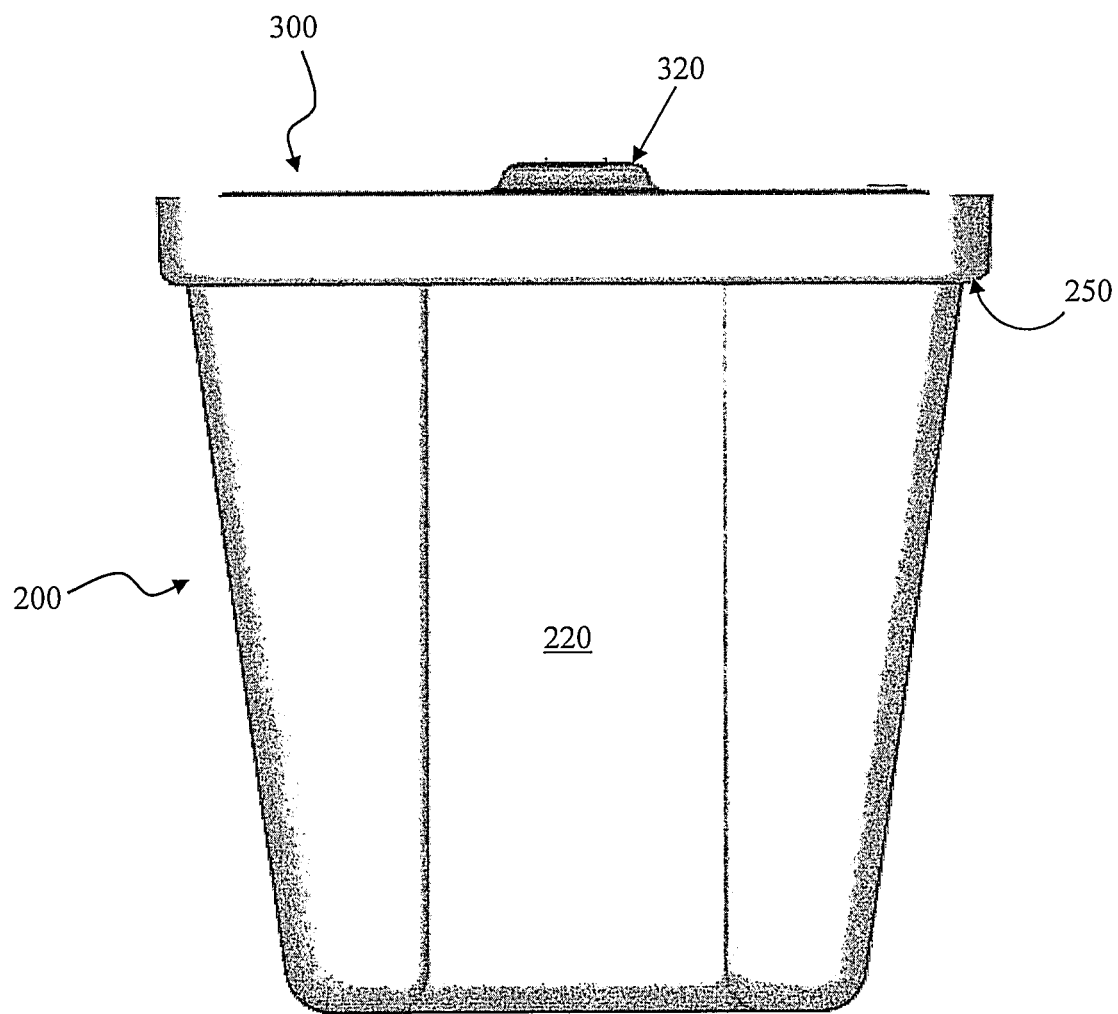
Figure 1D:
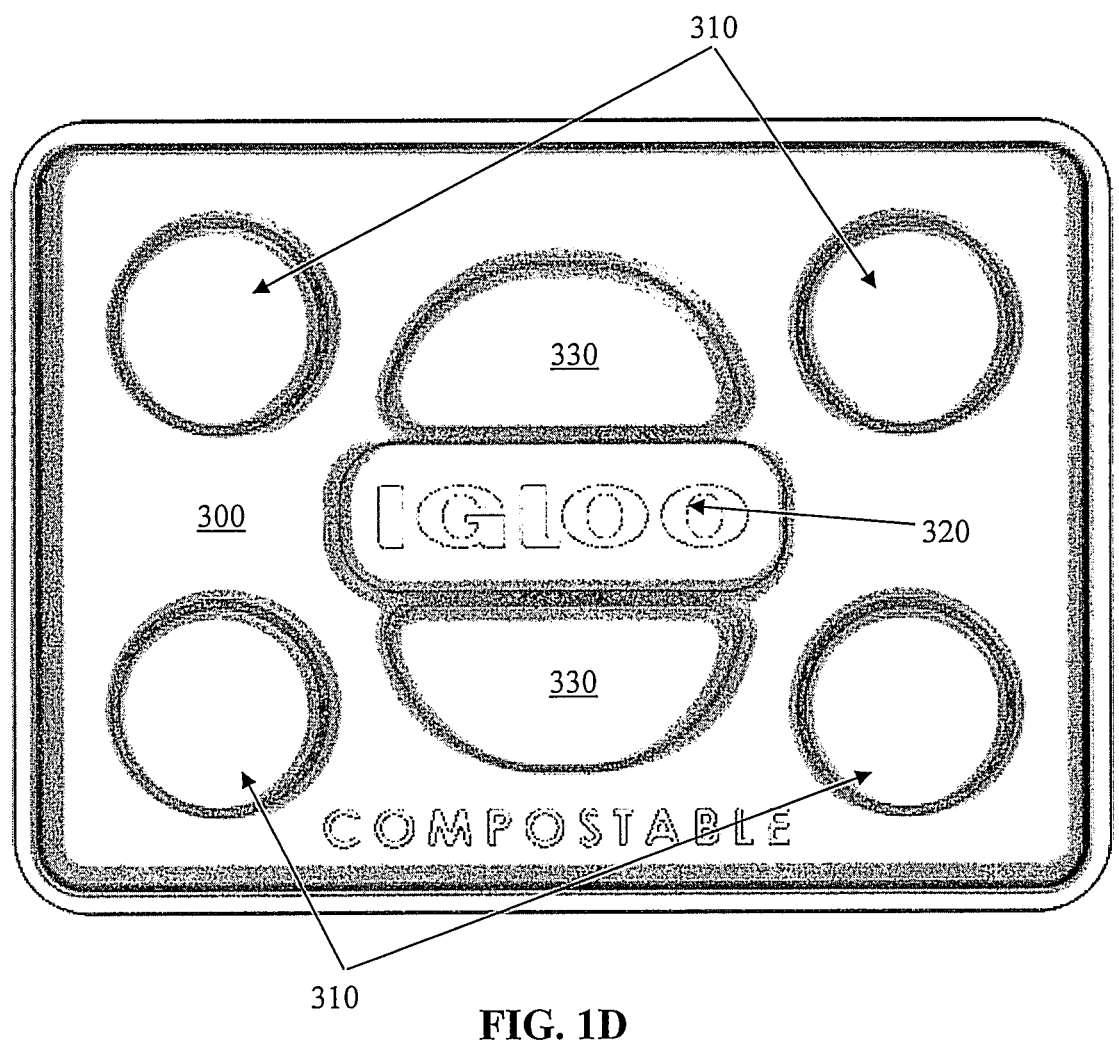
Figure 1E:
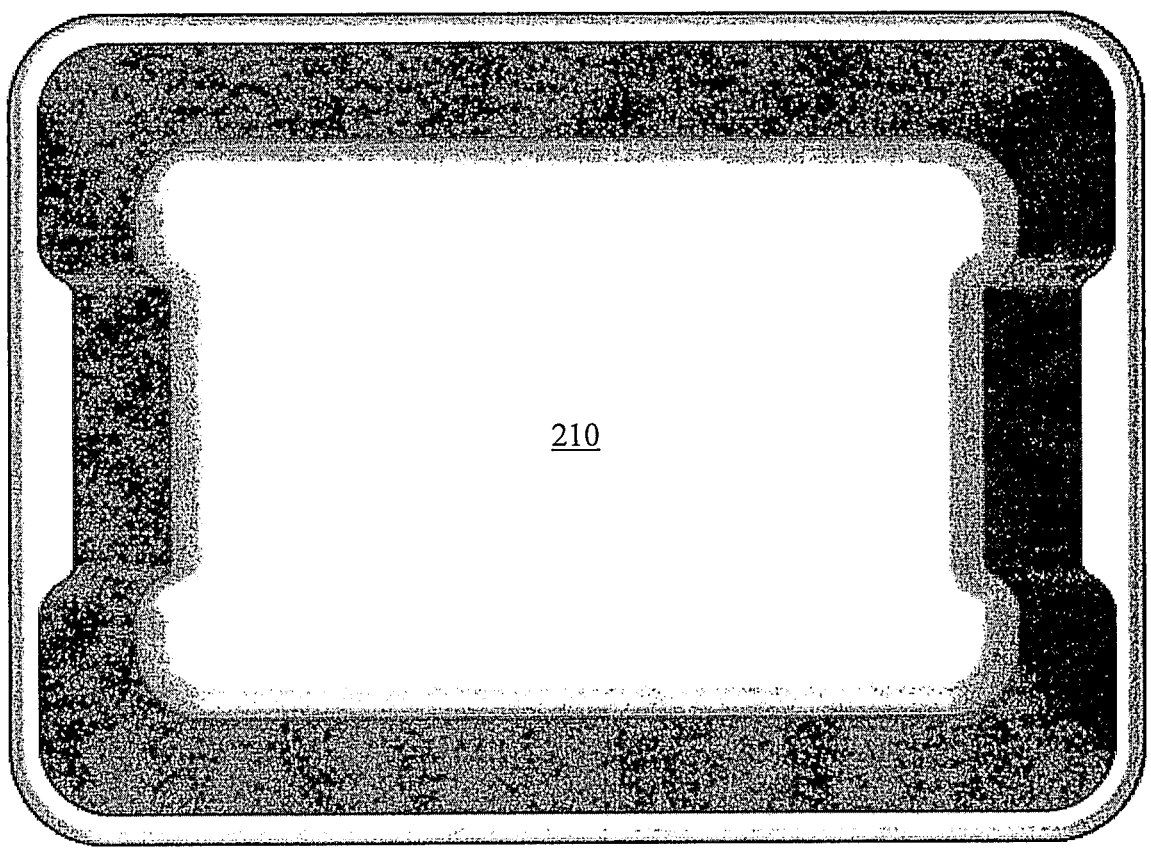
Figure 1F:
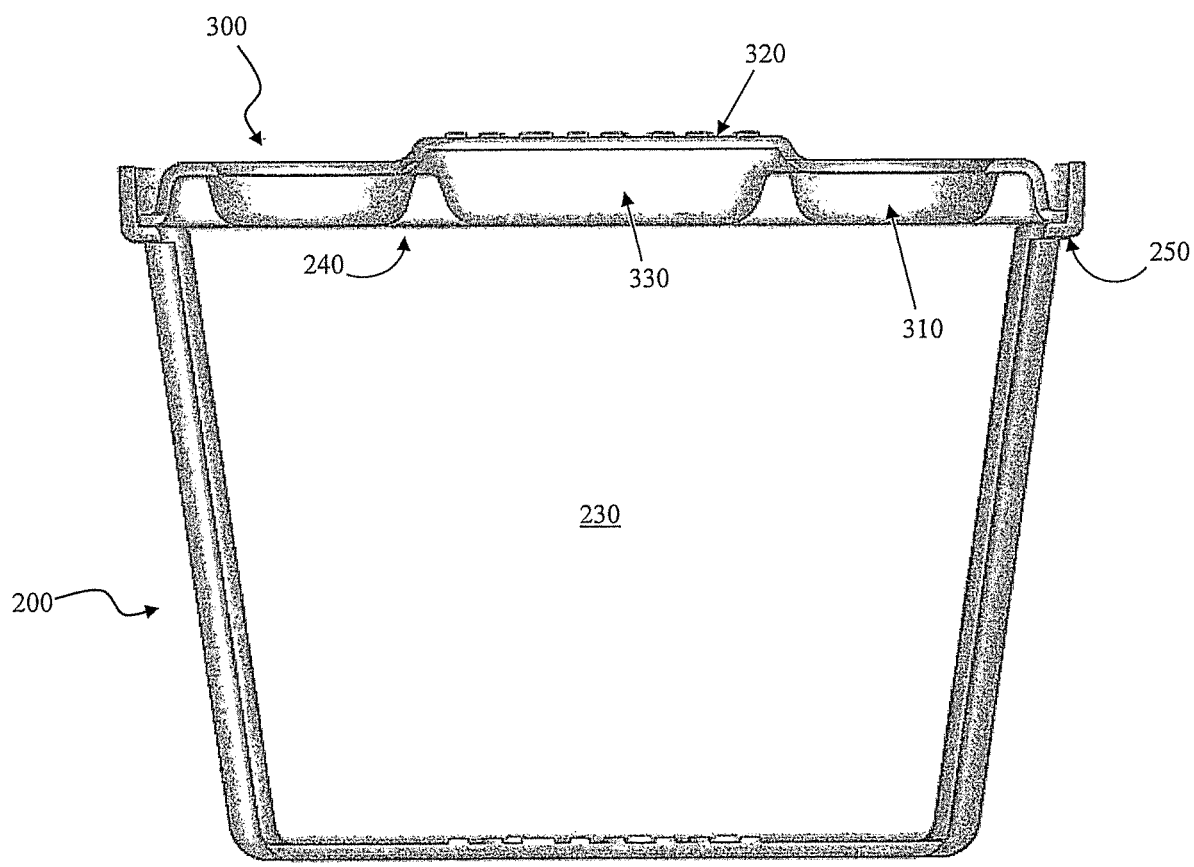

Referring now to FIGS. 1A-1F, the lid 300 can be formed so as to fit inside of the upper ends of the plurality of support walls 220 according to a first embodiment of the present disclosure. FIG. 1A illustrates a perspective view of the cooler 100 according to the first embodiment of the present disclosure; FIG. 1B illustrates a front view of the cooler 100 according to the first embodiment of the present disclosure; FIG. 1C illustrates a side view of the cooler 100 according to the first embodiment of the present disclosure; FIG. 1D illustrates a top view of the cooler 100 according to the first embodiment of the present disclosure; FIG. 1E illustrates a bottom view of the cooler 100 according to the first embodiment of the present disclosure; and FIG. 1F illustrates a cross-sectional front view of the cooler 100 according to the first embodiment of the present disclosure.

As shown in FIGS. 1A-1F, the support walls 220 can be formed with a ledge 250 disposed beneath the upper ends of the support walls 220. The ledge 250 can be formed so as to be substantially parallel with the base 210, as described above. The lid 300 can be formed such that outer edges thereof rest on an interior surface of the ledge 250 when the lid 300 covers or substantially covers the opening 240 of the body 200.

In addition, the lid 300 can be formed with a handle portion 320 disposed at a central region thereof. The handle portion 320 can enable a user to grip a top surface of the lid 300 in order to remove the lid 300 from the opening 240 of the body 200. The handle portion 320 can be formed in any manner suitable for a user's grip. In one example, the handle portion 320 can include a portion of the lid 300 which protrudes outwardly from an indentation region 330, as shown in FIGS. 1A-1F. In another example, the handle portion 320 can include an elongated aperture (not shown) formed into a portion of the lid 300 protruding outwardly from a top surface of the lid 300. The elongated aperture can be formed to enable a user to insert his or her fingers therethrough.

Figure 2A:
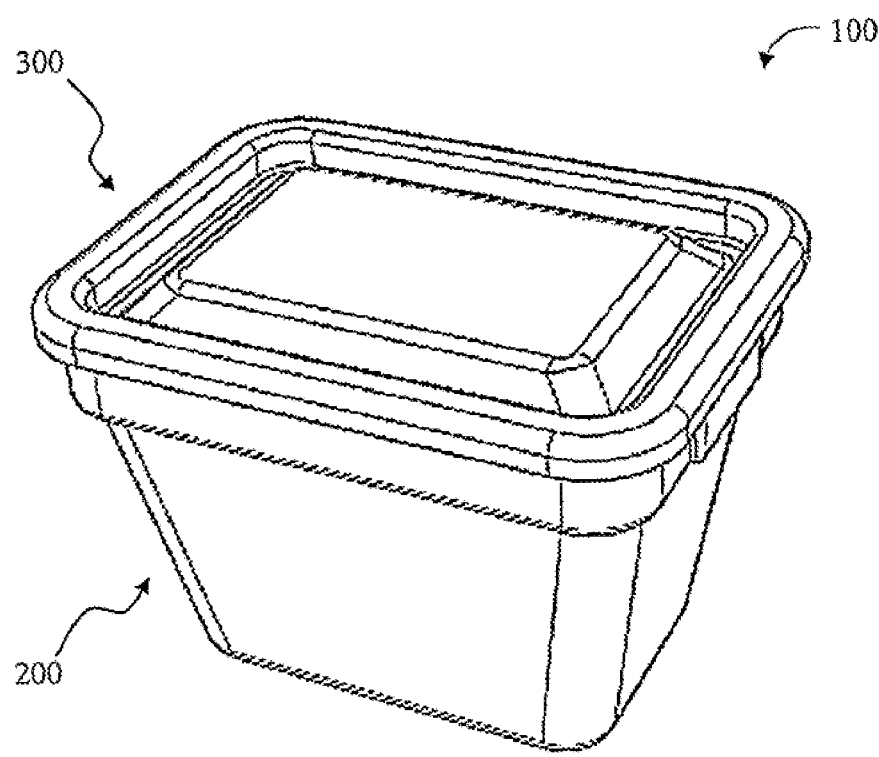
FIGS. 2A-2E include views of a single-walled disposable cooler according to a second embodiment of the present disclosure.
Figure 2B:
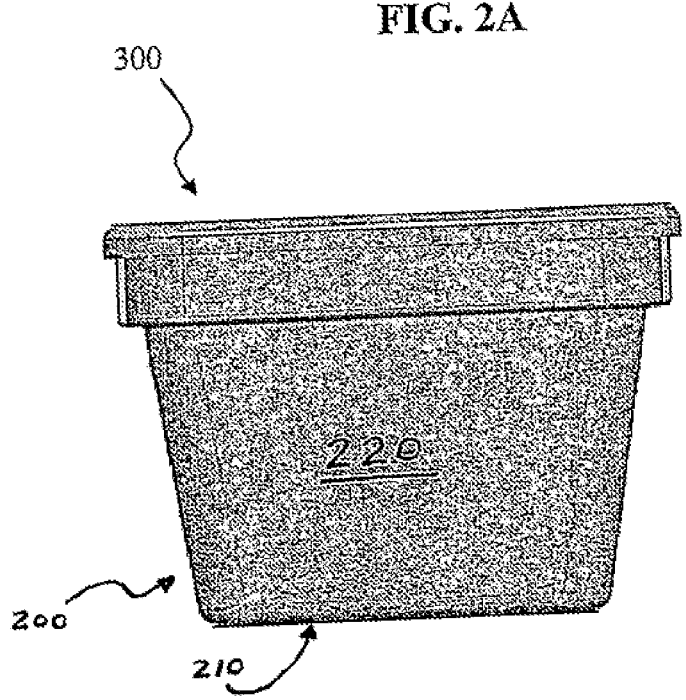
Figure 2C:
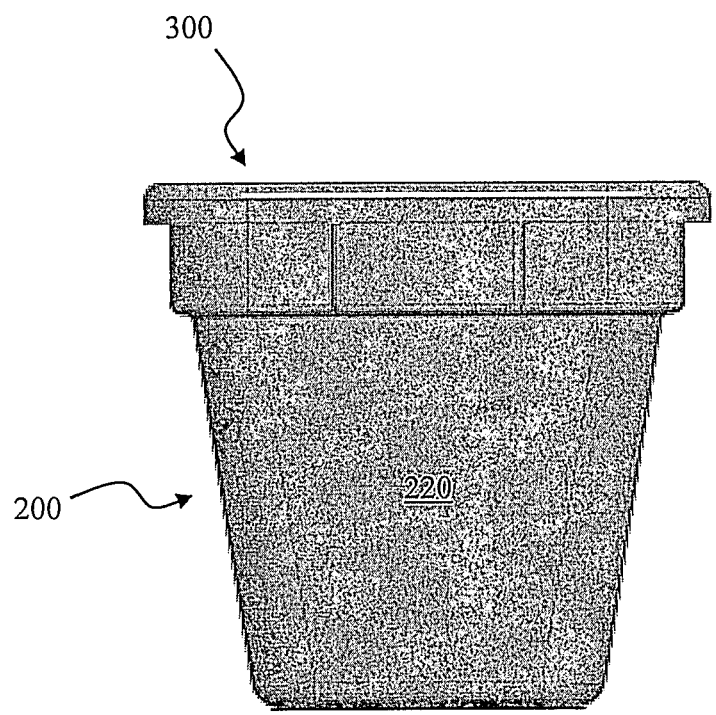
Figure 2D:
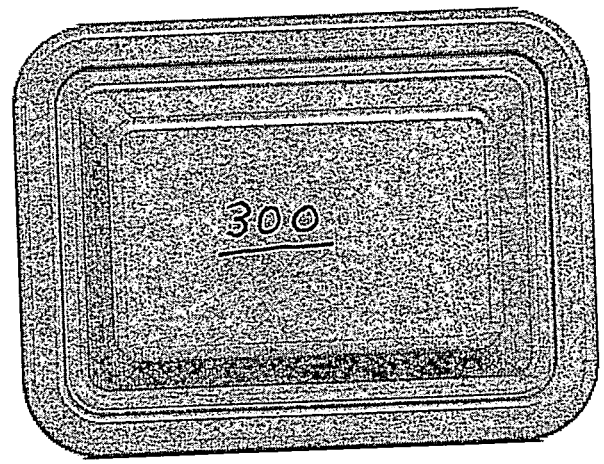
Figure 2E:
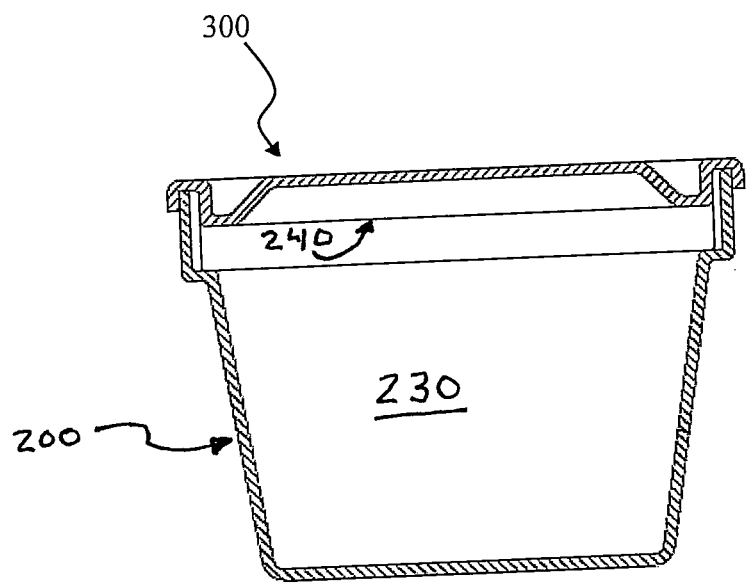

Referring now to FIGS. 2A-2E, the lid 300 can be formed such that outer edges thereof are positioned outside of the plurality of support walls 220 in a lateral direction when the lid 300 covers the opening 240 of the body 200 according to a second embodiment of the present disclosure. FIG. 2A illustrates a perspective view of the cooler 100 according to the second embodiment of the present disclosure; FIG. 2B illustrates a front view of the cooler 100 according to the second embodiment of the present disclosure; FIG. 2C illustrates a side view of the cooler 100 according to the second embodiment of the present disclosure; FIG. 2D illustrates a top view of the cooler 100 according to the second embodiment of the present disclosure; and FIG. 2E illustrates a cross-sectional front view of the cooler 100 according to the second embodiment of the present disclosure.

As shown in FIGS. 2A-2E, the outer edges of the lid 300 can extend downwardly below upper ends of the support walls 220. In this configuration, the lid 300 can fully cover the upper ends of the support walls 220, i.e., the rim of the body 200, as well as the opening 240 of the body 200. A user may be capable of the lifting the lid 300 from the opening 240 of the body 200 by gripping the outer edges of the lid 300 and pulling upwards.

Figure 3A:
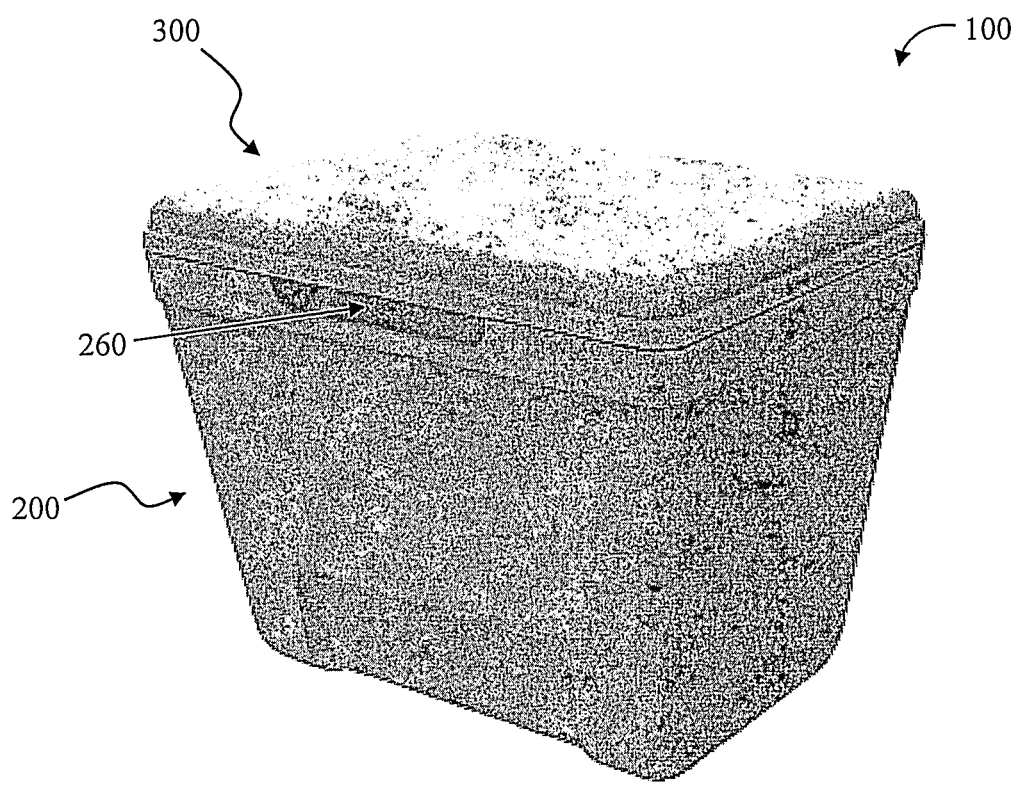
FIGS. 3A-3D include views of a single-walled disposable cooler according to a third embodiment of the present disclosure.
Figure 3B:
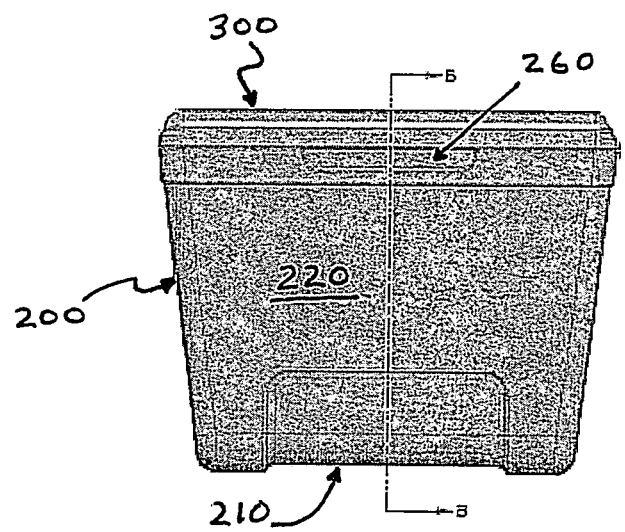
Figure 3C:
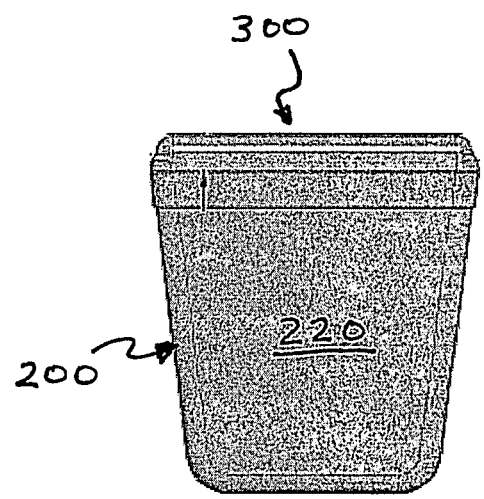
Figure 3D:
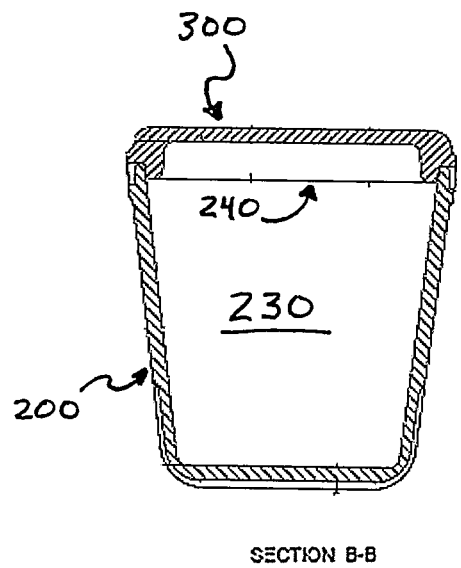

Referring now to FIGS. 3A-3D, the lid 300 can be formed such that outer edges thereof are substantially flush with upper ends of the plurality of support walls 220 when the lid 300 covers the opening 240 of the body 200 according to a third embodiment of the present disclosure. FIG. 3A illustrates a perspective view of the cooler 100 according to the third embodiment of the present disclosure; FIG. 3B illustrates a front view of the cooler 100 according to the third embodiment of the present disclosure; FIG. 3C illustrates a side view of the cooler 100 according to the third embodiment of the present disclosure; and FIG. 3D illustrates a cross-sectional side view of the cooler 100 according to the third embodiment of the present disclosure.

As shown in FIGS. 3A-3D, the body 200 can be formed with a handle portion 260 disposed at an upper region thereof. In this configuration, the handle portion 260 can include an indentation region formed into a portion of the upper ends of the support walls 220, enabling a user to grip a bottom surface of the lid 300. The user, gripping the bottom of the lid 300 within the aforementioned indentation region of the body 200, can pull the lid 300 upwards to remove the lid 300 from the opening 240 of the body 200.

Figure 4A:
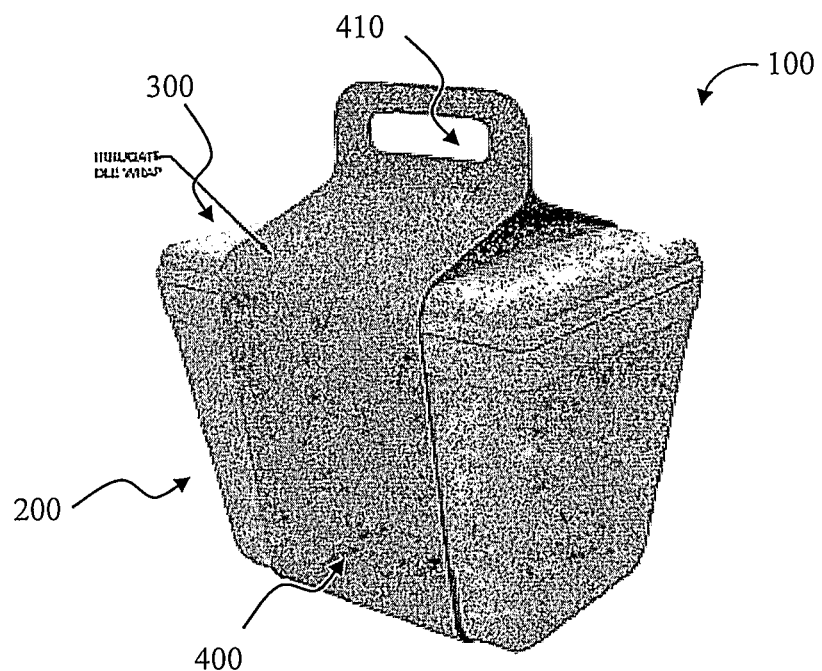
FIGS. 4A-4C include views of a single-walled disposable cooler according to a fourth embodiment of the present disclosure.
Figure 4B:
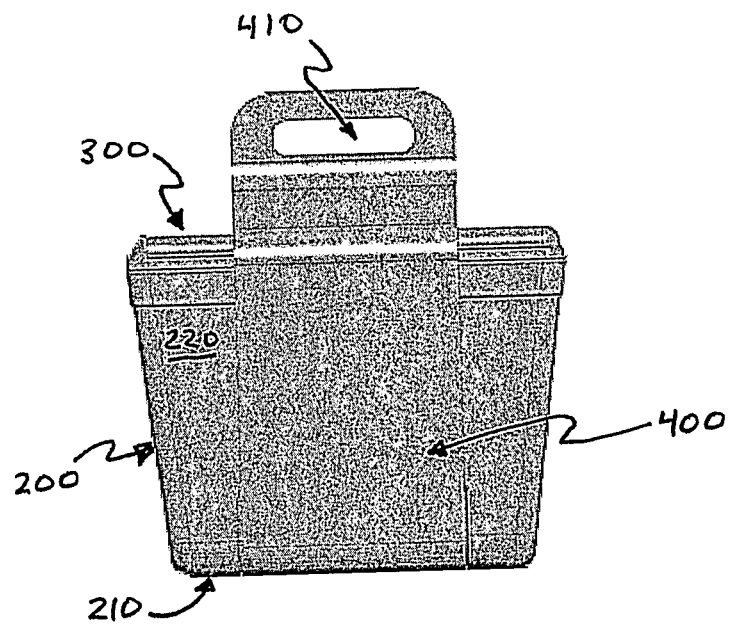
Figure 4C:
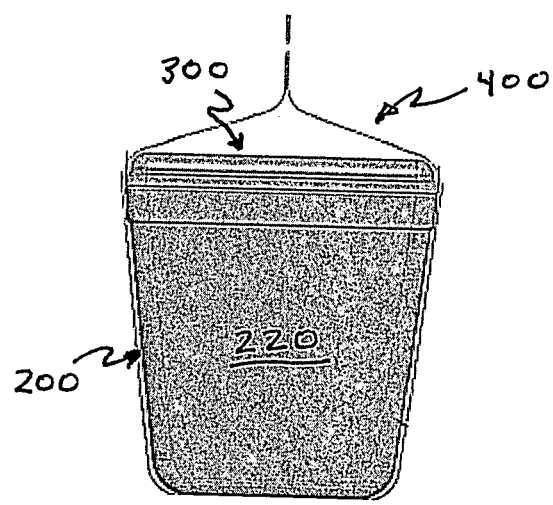

Referring now to FIGS. 4A-4C, the cooler 100 can further include a handle wrap 400 structurally independent of the body 200 and the lid 300 according to a fourth embodiment of the present disclosure. FIG. 4A illustrates a perspective view of the cooler 100 according to the fourth embodiment of the present disclosure; FIG. 4B illustrates a front view of the cooler 100 according to the fourth embodiment of the present disclosure; and FIG. 4C illustrates a side view of the cooler 100 according to the fourth embodiment of the present disclosure.

As shown in FIGS. 4A-4C, the handle wrap 400 can be formed with a cut-out portion 410 shaped in a manner allowing a user to insert his or her fingers therethrough. When the lid 300 covers the opening of the body 200, the handle wrap 400 can be configured to surround an entirety of the body 200 and the lid 300 in a longitudinal direction such that the cut-out portion 410 is positioned above the body 200 and the lid 300. The handle wrap 400 can provide for transport of the cooler 100 without the need to form a physical handle portion into either of the body 200 or lid 300.

In this configuration, the lid 300 can be formed such that outer edges thereof are substantially flush with upper ends of the plurality of support walls 220 when the lid 300 covers or substantially covers the opening 240 of the body 200, as shown in FIGS. 4A-4C. However, the cooler 100 is not limited as such.

Like the body 200, the handle wrap 400 can be made entirely of a disposable, biodegradable and/or recyclable material, such as a pulp-based material. Thus, when the cooler 100 includes the handle wrap 400, all components of the cooler 100 (i.e., body 200, lid 300, and handle wrap 400) can be compostable, recyclable, and/or biodegradable. Alternatively, the handle wrap 400 can be made of a non-biodegradable and/or non-recyclable material, such as a plastic, rubber or rubber-like material, or other suitable material that is not biodegradable or recyclable.

Pursuant to any of the embodiments described above and referring to FIGS. 1-4, the body 200 of a second cooler 100 can be stackable with the body 200 of a first cooler 100 according to some embodiments. In those embodiments, each of the plurality of support walls 220 of each cooler 100 is oriented outwardly (not perpendicular) from the base 210 so that the opening 240 that is formed at the distal ends of the support walls 220 is larger than the base 210. The base 210 of the second cooler 100 is insertable into the opening 240 of the first cooler 100, such that the second cooler 100 slides downwardly into the interior cavity 230 of the first cooler 100. Similarly, the body 200 of a third cooler 100 can slide into the interior cavity 230 of the second cooler 100. This can be repeated as the bodies 200 of the coolers 100 is stackable with one another.

Accordingly, the single-walled disposable cooler described herein can be made of a disposable, biodegradable and/or recyclable material, such as a pulp-based material, that is compostable, recyclable, and/or biodegradable. As a result, the cooler can be disposed in an eco-friendly manner in which the cooler disintegrates in a compost environment rapidly relative to conventional polystyrene coolers and without leaving toxicity into the soil. The disposable, biodegradable and/or recyclable material, such as a pulp-based material, used for fabricating the single-walled cooler described herein can comply with modern regulations prohibiting sale of polyethylene products, while providing consumers with a storage solution that is disposable. Moreover, the single-walled disposable cooler described herein can include convenient features such as cup holders, handles, and the like, and reliably retain water for several days upon adding a wax additive to the pulp-based material used to construct the cooler.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A single-walled disposable cooler comprising:
   a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper terminus of the body in fluid communication with the interior cavity;
   a lid configured to reversibly couple with the body, the lid shaped to at least substantially cover the opening of the body;
   wherein the body is made entirely of a disposable, biodegradable and/or recyclable material, the disposable, biodegradable and/or recyclable material being a pulp-based material;
   wherein the lid is formed so as to fit inside of upper ends of the plurality of support walls;
   wherein the outer edges of the lid extend downwardly below upper ends of the plurality of support walls, and said lid having a handle portion at a central region thereof.

2. The single-walled disposable cooler of claim 1, wherein the body is formed with a handle portion disposed at an upper region of the body.

3. A single-walled disposable cooler comprising:
a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper terminus of the body in fluid communication with the interior cavity; and
a lid configured to reversibly couple with the body, the lid shaped to at least substantially cover the opening of the body;
wherein the body is made entirely of a disposable, biodegradable and/or recyclable material;
wherein the lid is formed with one or more cup holders disposed on a top portion thereof.

4. The single-walled disposable cooler of claim 3, wherein one or more of the plurality of support walls are continuously and seamlessly coupled to the base.

5. The single-walled disposable cooler of claim 3, wherein the disposable, biodegradable and/or recyclable material is a pulp-based material.

6. The single-walled disposable cooler of claim 3, wherein the lid is formed so as to fit inside of upper ends of the plurality of support walls.

7. The single-walled disposable cooler of claim 6, wherein the plurality of support walls are formed with a ledge disposed beneath the upper ends of the plurality of support walls, the ledge being substantially parallel with the base, and the lid is formed such that outer edges thereof rest on an interior surface of the ledge when the lid at least substantially covers the opening of the body.

8. The single-walled disposable cooler of claim 6, wherein the lid is formed with a handle portion disposed at a central region thereof.

9. The single-walled disposable cooler of claim 3, wherein the lid is formed such that outer edges thereof are substantially flush with upper ends of the plurality of support walls when the lid at least substantially covers the opening of the body.

10. The single-walled disposable cooler of claim 9, wherein the body is formed with a handle portion disposed at an upper region thereof.

11. The single-walled disposable cooler of claim 9, further comprising a handle wrap structurally independent of the body and the lid, the handle wrap having a cut-out portion formed therein,
wherein, when the lid at least substantially covers the opening of the body, the handle wrap is configured to surround an entirety of the body and the lid in a longitudinal direction such that the cut-out portion is positioned above the body and the lid.

12. The single-walled disposable cooler of claim 11, wherein the handle wrap is made entirely of a disposable, biodegradable and/or recyclable material.

13. The single-walled disposable cooler of claim 3, wherein the lid is made entirely of a pulp-based material.

14. The single-walled disposable cooler of claim 3, wherein the disposable, biodegradable and/or recyclable material is a pulp-based material derived from recycled paper.

15. The single-walled disposable cooler of claim 3, wherein the disposable, biodegradable and/or recyclable material is a pulp-based material made with a combination of recycled paper and wax.

16. The single-walled disposable cooler of claim 3, wherein the disposable, biodegradable and/or recyclable material is a pulp-based material that includes a wax additive.

17. The single-walled disposable cooler of claim 3, wherein the disposable, biodegradable and/or recyclable material is a pulp-based material that is compostable.

18. The single-walled disposable cooler of claim 3, wherein the plurality of support walls extend outwardly away from the base and the opening formed is larger than the base, wherein the body of the cooler is shaped to receive a body of a second single-walled disposable cooler, making the second single-walled disposable cooler stackable with the single-walled disposable cooler.

19. A single-walled disposable cooler comprising:
a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper terminus of the body in fluid communication with the interior cavity; and
a lid configured to reversibly couple with the body, the lid shaped to at least substantially cover the opening of the body;
wherein the body is made entirely of a disposable, biodegradable and/or recyclable material;
wherein the lid is made of a non-pulp-based material.

20. A method for manufacturing a single-walled disposable cooler comprising:
forming, using a pulp-based material, a body including a base and a plurality of support walls coupled to the base, such that at least one of the plurality of support walls includes an entirely planar surface, the plurality of support walls and the base define an interior cavity of the body, and the plurality of support walls extend upwardly from the base to form an opening at an upper region of the body in fluid communication with the interior cavity; and
forming a lid configured to reversibly couple with the body, such that the lid is shaped to cover the opening of the body and forming said lid with one or more cup holders on a top portion thereof;
forming said body and said lid of a disposable, biodegradable and/or recyclable material.

21. A cooler comprising:
a single-walled disposable shell made entirely of a pulp-based material, the shell including:
a body including a base and a plurality of support walls coupled to the base, at least one of the plurality of support walls including an entirely planar surface, the plurality of support walls and the base defining an interior cavity of the body, and the plurality of support walls extending upwardly from the base to form an opening at an upper region of the body in fluid communication with the interior cavity; and
a lid configured to reversibly couple with the body, the lid shaped to cover the opening of the body,
wherein the lid is formed so as to fit inside of upper ends of the plurality of support walls, and formed with one or more cup holders disposed on a top portion thereof.

* * * * *